United States Patent [19]

Huret

[11] 4,431,910
[45] Feb. 14, 1984

[54] DISTANCE RECORDER HAVING A PLANETARY REDUCING MECHANISM FOR A TWO-WHEELED VEHICLE OR THE LIKE

[75] Inventor: Alain P. B. Huret, Bougival, France
[73] Assignee: Huret et ses Fils, Nanterre, France
[21] Appl. No.: 367,745
[22] Filed: Apr. 12, 1982
[30] Foreign Application Priority Data Apr. 22, 1981 [FR] France ............................... 81 07997

[51] Int. Cl.³ ............................................ G01C 22/00
[52] U.S. Cl. ....................................... 235/96; 74/804
[58] Field of Search ...................... 235/95 B, 96, 95 R; 74/804

[56] References Cited

U.S. PATENT DOCUMENTS 4,350,880 9/1982 Quintilian ............................... 235/96
4,354,097 10/1982 Menager ............................... 235/96

Primary Examiner—Benjamin R. Fuller
Attorney, Agent, or Firm—Trexler, Bushnell & Wolters, Ltd.

[57] ABSTRACT

The reducing mechanism comprises rings stacked one inside the other, namely an annular planet gear having two superimposed sets of teeth having different numbers of teeth. One set of teeth is engaged with a fixed ring gear formed in the case of the recorder and the other set of teeth is engaged with a freely rotatable second gear carrying a spiral gear engaged with a gear for driving the recording means. An eccentric rigid with the driving cable of the recorder is mounted inside the planet gear and displaces the latter. The eccentric defines a cavity for receiving a magnetized disc of a magnetic speedometer.

9 Claims, 4 Drawing Figures

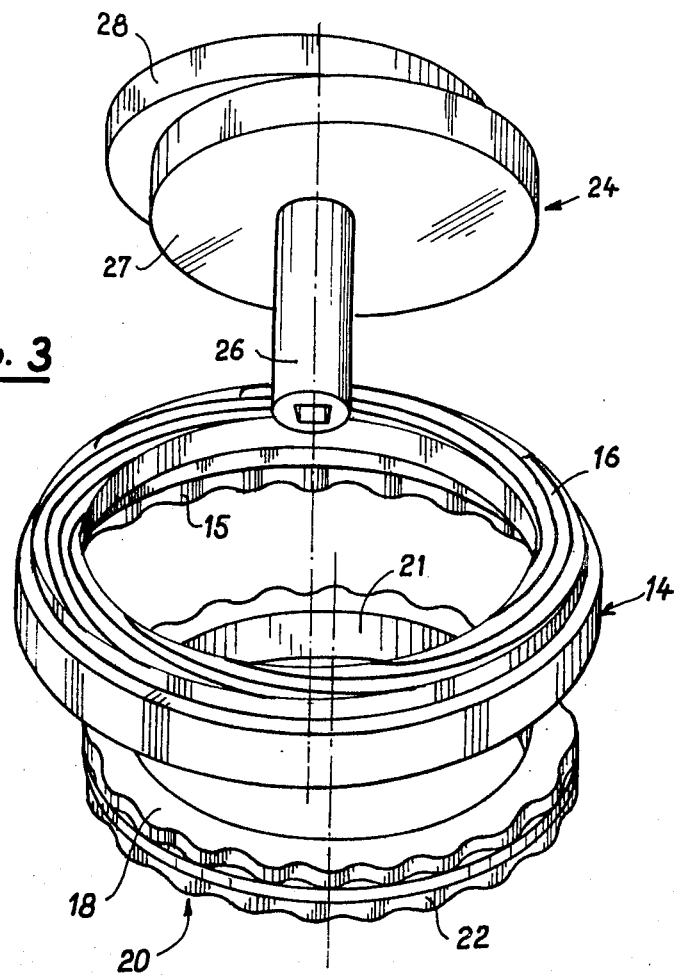
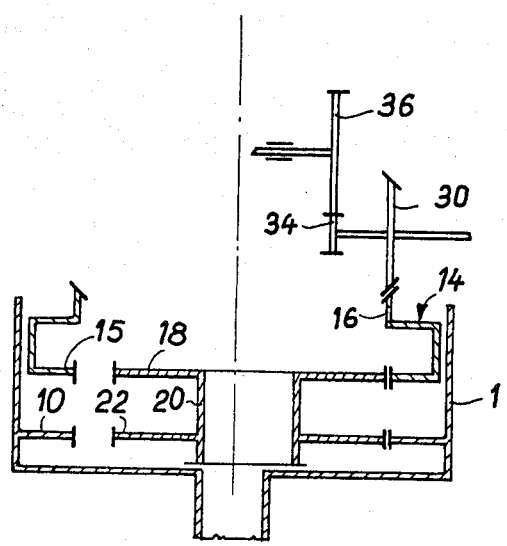

DISTANCE RECORDER HAVING A PLANETARY REDUCING MECHANISM FOR A TWO-WHEELED VEHICLE OR THE LIKE

DESCRIPTION

It is well known that the distance or kilometer recorders for two-wheeled vehicles or the like must not only be strong but also have dimensions which are as small as possible and a high torque.

The recorders usually employed comprise, within a case extended by a driving cable entrance portion, an indicating and adding system and a reducing mechanism interposed between this system and a rotary shaft which is rigid with the driving cable. In order to obtain a sufficiently large and precise reduction, the reducing mechanism comprises worm-wheel and worm arrangements.

The reduction is satisfactory. However, worms are difficult to manufacture and they must be assembled with precision.

An object of the present invention is to render the reducing mechanism simpler to produce and assemble while reducing its overall size.

The invention consequently provides a distance recorder whose reducing mechanism comprises an eccentric planet gear carrying two coaxial superimposed outer sets of teeth having different numbers of teeth, one set of teeth being engaged with a fixed set of teeth and the other set of teeth being engaged with a freely rotatable second gear, an eccentric rigid with the shaft connected to the driving cable which drives the planet gear so as to rotate the freely rotatable gear, the latter having in its upper part a spiral gear for driving the indicating and adding system.

In such a mechanism, the various component parts: the planet gear, the fixed set of teeth, for example, are formed by rings of small axial height which are simply disposed one above the other, or one inside the other, and must simply be disposed in such manner as to be put in contact without particular precision.

According to another feature, the recorder according to the invention also comprises a magnetic speedometer, the eccentric having a centre aperture for disposing a magnetised disc and a cup rigid with an indicator needle or pointer.

The ensuing description of one embodiment, which is given merely by way of example, will bring out the advantages and features of the invention. In the drawings:

FIG. 3 is an exploded view of the component parts of the reducing mechanism before they are inserted in the case, and FIG. 4 is a diagram of the kinematic chain of the reducing mechanism.

Figure 1:
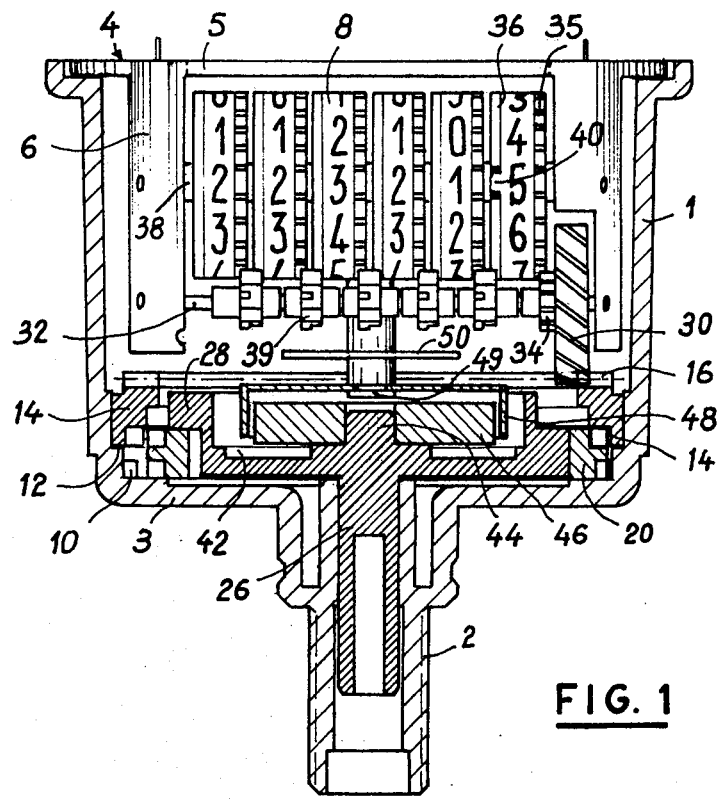
FIG. 1 is an axial sectional view of a recorder according to the invention.
Figure 2:
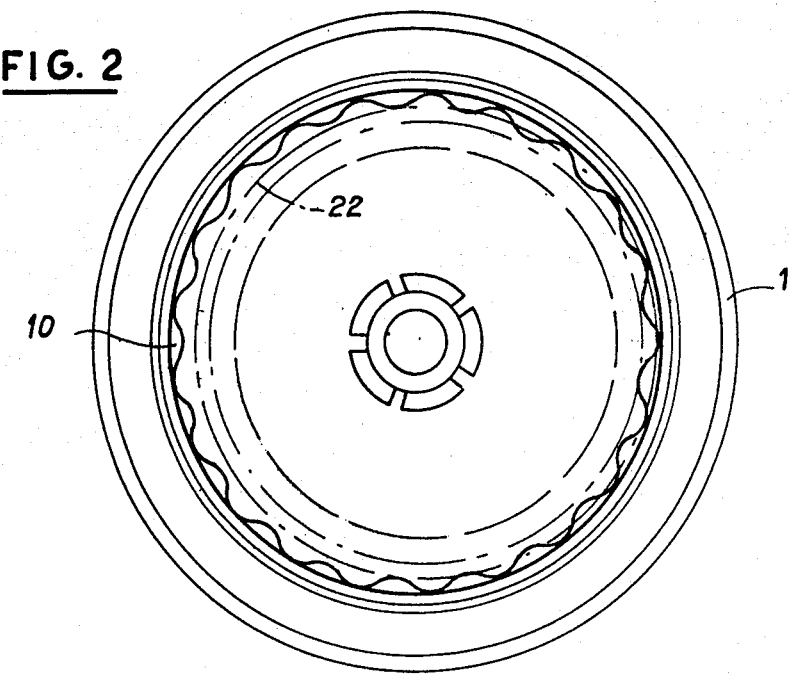
FIG. 2 is a top plan view of the case of this recorder.

The recorder or odometer shown in FIG. 1 comprises a case 1 which is extended at one of its ends by a driving cable entrance 2. At its opposite end, the case 1 is closed by a plate 4 which has a sheet 5 provided with a reading opening and branches 6 for supporting recording means 8. The lateral wall of the case 1 has, in the region of the bottom 3, a first internally toothed ring gear 10, and, slightly above this ring gear, an inner shoulder 12 which defines a cavity for a second or ring gear 14 of the planetary gear mechanism. As shown more particularly in FIG. 3, the ring gear 14 comprises an internal set of teeth 15 and, in its upper part, a spiral gear 16 whose teeth extend axially.

The ring gear 14 is freely rotatable inside the cylindrical case 1 on the shoulder 12. Its internal teeth 15 are however engaged with the upper teeth 18 of a planet gear 20 which is mounted eccentrically in the case 1. The planet gear 20 rotates on the bottom 3 of the cylindrical case and includes second external teeth 22 which are engaged with the internal teeth of the ring gear 10 of the case. The two sets of external teeth 18 and 22 are thus coaxial and superimposed but separated by a distance which substantially corresponds to the distance between the inner teeth 10 of the case and the inner teeth 15 of the ring gear 14. The sets of teeth 18 and 22 of the planet gear 20 have, however, different numbers of teeth, the lower set of teeth 22 having moreover a smaller number of teeth than that of the internal teeth of the ring gear 10 of the case, whereas the upper set of teeth 18 has a number of teeth similar to that of the internal teeth 15 of the ring gear 14. For example, there are twenty-one internal teeth on the ring gear 10 and the lower set of teeth 22 of the planet gear has only nineteen teeth, the upper set of teeth of the planet gear and the ring gear 14 having twenty teeth.

The internal surface 21 of the annular planet gear 20 is moreover in contact with an eccentric 24 which is rigid with a shaft 26 disposed in the extension 2 of the case 1 and adapted to be connected to the driving cable and to be rotatable with the latter. The eccentric 24 preferably has two circular discs offset 180° from each other and fixed on the same shaft 26 so that the maximum distance between the centre of this shaft and their peripheral edge corresponds to the inside diameter of the planet gear 20. The lower disc 27 has an axial thickness similar to that of the planet gear 20. Consequently, this lower disc 27 is always in contact with the planet gear 20 at a point whereas the upper disc 28 bears at an opposite point against the planet gear and maintains it in position inside the case 1 (FIG. 1).

When the driving cable rotates, the shaft 26 and the eccentric 24 are also driven in rotation. The lower disc 27 of the eccentric 24 alternately urges the planet gear 20 in two opposite directions in the course of each of its rotations and thus displaces it tooth-by-tooth around the fixed internal teeth of the ring gear 10 of the case. As the upper set of teeth 18 of the planet gear has a different number of teeth, it displaces the ring gear 14 a distance which is a function of this difference, and, consequently, displaces the spiral gear 16 of the upper part of the gear 14.

The spiral gear 16 is engaged with a gear 30 which is rotatably mounted on a shaft 32 carried by the two opposite branches 6 of the plate 4. The number of teeth of the gear 30 is preferably equal to the number of the spiral teeth of the spiral gear 16 but, on the other hand, this spiral gear 16 has a number of teeth distinctly less than that of the internal teeth 15 of the ring gear 14. For example, the ring gear 14 has twenty teeth and the spiral gear 16 and the gear 30 have thirteen teeth.

The rotation of the gear 30 is transmitted to the recording means since this gear 30 is rigid with a star gear 34 which is engaged with the lateral teeth 35 of the first of a series of graduated wheels 36. All the graduated wheels 36 are freely rotatable on the same shaft 38 carried by the two branches 6 of the plate 4 and comprise teeth 35 engaged with a star gear 39 which is freely rotatable on the shaft 32. Further, the graduated wheels 36, except for the last wheel, comprise a lateral lug 40 for driving the star gear 39 engaged with the following wheel. In this way, each wheel 36 rotates the following wheel through one graduation in each of its complete rotations and the displacement of the first wheel 36 is a function of the speed or rotation of the driving cable and of the speed reducing ratio of the reducing mechanism. It will be clear that this ratio may vary as a function of the number of teeth of the various component parts and in particular of the number of teeth of the ring gear and/or planet gear. This will be more clear from the diagram of FIG. 4 which shows the kinematic chain of the reducing mechanism driving the first graduated wheel 36.

This FIG. 4, as the FIG. 1, clearly shows the relative positions of the various annular component parts inside each other and their maintenance by simple contact with each other. Indeed, when the recorder is assembled, the annular planet gear 20 is inserted in the case so as to bear against the bottom 3 of the latter, then the ring gear 14 is in turn inserted and placed on the shoulder 12. The axial insertion of the eccentric 24 so that the driving shaft 26 slides in the extension 2 of the case urges the planet gear 20 laterally and causes the lower set of teeth 22 and upper set of teeth 18 to engage with the set of teeth 10 of the case and the internal teeth 15 of the ring gear 14 respectively. At the same time, the upper disc 28 of the eccentric 24 bears against the planet gear 20 to axially block the latter. The plate 4 carrying the recording means and the star gear 34 and the driving gear 30 can then be inserted in the case 1 so as to put the gear 30 in engagement with the spiral gear 16. No centering precision is required, since the initial relative angular positions of the various component parts have no importance. Their angular displacement under the effect of the rotation of the driving cable will be the same irrespective of which teeth of the component parts are initially in contact. The recorder is consequently extremly simple to assemble.

Further, the various component parts solely constituted by ring gears or planet gears are distinctly easier to produce than component parts of the worm or other type of gearing used before. Moreover, the teeth preferably do not have sharp edges but a curved contour which facilitates their sliding on the opposite teeth.

Preferably, the recorder constructed in this way also includes a speedometer device. For this purpose, the eccentric 24 is hollowed out in its centre part so as to form an annular cavity 42 around a centre spigot 44. Mounted in the cavity 42 is a magnetised disc 46 having an axial aperture fitting on the spigot 44. The diameter of the disc 46 is less than the diameter of the cavity 42 so that there may extend into the space therebetween the lateral skirt of a cup 48 which is rigid with a vertical shaft 49 supporting an indicator needle or pointer (not shown) mounted in the plate 4 and returned by a spiral spring 50. The magnetised disc 46 is thus driven at the same time as the eccentric 24 by the driving cable fixed to the shaft 26. This movement is transmitted thereby to the cup 48 and thence to the speed indicator needle.

The recorder constructed in this way may, in the same way as before, be mounted by a simple stacking of the various component parts inside the case. Further, the overall size of the reducing mechanism is limited to the height of the ring gear 14 above the bottom 3 of the case, ie. practically to the superimposition of the fixed gear 10 and movable gears 14 and 16, the other component parts, and in particular the planet gear and the eccentric, with optionally the magnetised disc and the cup 48, being placed in this space. Consequently, there is obtained a recorder of much smaller size than the conventional recorders which moreover has the advantage of being easy to assemble with no particular requirements as concerns precision.

Having now described my invention what I claim as new and desire to secure by Letters Patent is:

1. A distance recorder comprising a case having a bottom end wall, a mechanism enclosed in said case and including a driving cable extending out of said case, recording and adding means, and a transmission interposed between the driving cable and the recording and adding means and comprising a rotatable planet gear disposed axially against the bottom end wall and carrying two superimposed coaxial sets of outer teeth which sets have different numbers of teeth, a first internal gear fixed in position in said case and engaged with one of said sets of teeth, a second internal gear which is coaxial with said first internal gear and freely rotatably mounted in said case and engaged with the other of said sets of teeth, a shaft coaxial with said internal gears and rotatably mounted in said case, and an eccentric rigid with the shaft, which shaft is drivenly connected to the driving cable, the planet gear being freely rotatably mounted on the eccentric so as to be made to rotate around said first internal gear and thereby rotate the second gear relatively to said case, the second gear having a spiral gear which has teeth extending axially upwardly from an upper surface of the second gear and is drivingly connected to the recording and adding means, the first and second internal gears, the planet gear and said bottom end wall being parallel to one another and assembled in a compact manner axially of the shaft so as to take up substantially a minimum amount of space at the bottom of the case.

2. A distance recorder according to claim 1, wherein said fixed gear is moulded with the case.

3. A distance recorder according to claim 1, wherein a lower set of said sets of teeth of the planet gear has a smaller number of teeth than an upper set of said sets of teeth.

4. A distance recorder according to claim 1, 2 or 3, wherein a lower set of said sets of teeth of the planet gear has a smaller number of teeth than the fixed gear with which it is engaged.

5. A distance recorder according to any one of the claims 1 to 3, wherein the second rotatable gear comprises a ring of radial teeth having a number of teeth equal to the number of teeth of an upper set of said sets of teeth of the planet gear and the spiral gear has a smaller number of axial teeth.

6. A distance recorder according to any one of the claims 1 to 3, comprising a star gear drivingly connected to the recording and adding means and rigid with a gear engaged with the spiral gear of said second gear.

7. A distance recorder according to any one of the claims 1 to 3, in combination with a speedometer, wherein the eccentric has a centre cavity and the speedometer comprises a magnetised disc which is disposed in said cavity and is rigid with said eccentric and a cup carried by a shaft carrying a speed indicator needle.

8. A distance recorder according to any one of the claims 1 to 3, wherein the driving eccentric comprises two eccentric discs offset 180° from each other and rigid with a driving shaft, a lower disc of said discs being in contact with an inner surface of the planet gear and the other disc moving freely within the second gear above the planet gear.

9. A distance recorder according to any one of the claims 1 to 3, wherein the spiral gear is drivingly connected to the recording and adding means through a gear which has the same number of teeth as the spiral gear.

* * * * *